United States Patent
Trappier et al.

(10) Patent No.: US 10,138,737 B2
(45) Date of Patent: Nov. 27, 2018

(54) ROTOR FOR TURBINE ENGINE COMPRISING BLADES WITH ADDED PLATFORMS

(71) Applicant: SAFRAN AIRCRAFT ENGINES, Paris (FR)

(72) Inventors: Nicolas Trappier, Maisons Alfort (FR); Antoine Jean-Philippe Beaujard, Chevilly Larue (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 15/316,423

(22) PCT Filed: Jun. 3, 2015

(86) PCT No.: PCT/FR2015/051471
§ 371 (c)(1),
(2) Date: Apr. 24, 2017

(87) PCT Pub. No.: WO2015/185860
PCT Pub. Date: Dec. 10, 2015

(65) Prior Publication Data
US 2017/0218778 A1 Aug. 3, 2017

(30) Foreign Application Priority Data
Jun. 3, 2014 (FR) ..................... 14 55017

(51) Int. Cl.
| F01D 5/22 | (2006.01) |
| F01D 5/02 | (2006.01) |
| F01D 5/14 | (2006.01) |
| F01D 5/30 | (2006.01) |
| F01D 5/32 | (2006.01) |
| F01D 11/00 | (2006.01) |

(52) U.S. Cl.
CPC ............... F01D 5/225 (2013.01); F01D 5/02 (2013.01); F01D 5/141 (2013.01); F01D 5/3007 (2013.01);
(Continued)

(58) Field of Classification Search
CPC .... F01D 11/005; F01D 11/006; F01D 11/008; F01D 5/30; F01D 5/3007; F01D 5/3015;
(Continued)

(56) References Cited

U.S. PATENT DOCUMENTS

| 4,033,705 A | 7/1977 | Luebering |
| 5,161,949 A * | 11/1992 | Brioude .................... F01D 5/22 416/193 A |

(Continued)

FOREIGN PATENT DOCUMENTS

| EP | 1 306 523 A1 | 5/2003 |
| FR | 1 426 933 A | 2/1966 |

(Continued)

OTHER PUBLICATIONS

International Search Report as issued in International Patent Application No. PCT/FR2015/051471, dated Aug. 25, 2015.
(Continued)

*Primary Examiner* — Kenneth Bomberg
*Assistant Examiner* — Julian Getachew
(74) *Attorney, Agent, or Firm* — Pillsbury Winthrop Shaw Pittman LLP

(57) ABSTRACT

A rotor for a turbine engine includes a disk having cavities called primary cavities at its periphery; a plurality of blades each having a root of which the lower part is composed of a bulb locked axially in the primary cavities; a plurality of added platforms, each being arranged between two consecutive blades, wherein the platforms have: a substantially straight plate and a bulb extending radially under the plate,
(Continued)

the bulb being locked axially in the secondary cavities arranged at the periphery of the disk, the secondary cavities being positioned between two consecutive primary cavities; a spoiler extending in the axial direction, the spoiler forming an annular sector facing at least two consecutive blades.

12 Claims, 3 Drawing Sheets

(52) U.S. Cl.
CPC ............ *F01D 5/3015* (2013.01); *F01D 5/32* (2013.01); *F01D 11/006* (2013.01); *F01D 11/008* (2013.01); *F05D 2220/30* (2013.01); *F05D 2260/30* (2013.01); *F05D 2300/10* (2013.01); *Y02T 50/672* (2013.01)

(58) Field of Classification Search
CPC . F01D 5/32; F01D 5/323; F01D 5/326; F01D 5/22; F01D 5/225; F01D 5/147; F05D 2220/30; F05D 2260/30; F05D 2300/10
See application file for complete search history.

(56) References Cited

U.S. PATENT DOCUMENTS

| | | | | |
|---|---|---|---|---|
| 7,284,958 | B2* | 10/2007 | Dundas | ................ F01D 5/3007 |
| | | | | 416/193 A |
| 7,878,763 | B2* | 2/2011 | Keith | ..................... F01D 5/147 |
| | | | | 416/193 A |

FOREIGN PATENT DOCUMENTS

| | | |
|---|---|---|
| FR | 2 524 933 A1 | 10/1983 |
| FR | 2 608 674 A1 | 6/1988 |
| FR | 2 918 409 A1 | 1/2009 |

OTHER PUBLICATIONS

International Preliminary Report on Patentability and the Written Opinion of the International Searching Authority as issued in International Patent Application No. PCT/FR2015/051471, dated Dec. 6, 2016.

* cited by examiner

ROTOR FOR TURBINE ENGINE COMPRISING BLADES WITH ADDED PLATFORMS

CROSS-REFERENCE TO RELATED APPLICATIONS

This is the U.S. National Stage of PCT/FR2015/051471, filed Jun. 3, 2015, which in turn claims priority to French Application No. 1455017, filed Jun. 3, 2014, the entire contents of all applications are incorporated herein by reference in their entireties.

TECHNICAL DOMAIN OF THE INVENTION

The technical domain of the invention is rotors for turbine engines, for example such as a turbojet or a turboprop for an aircraft comprising a plurality of blades with offset platforms. These rotors are intended for use particularly in a fan, a compression stage or a high or low pressure turbine stage of a turbine engine.

The invention is aimed more specifically at rotor blade platforms for a high or low pressure turbine of a turbine engine, but it can also be applied to platforms of other rotating assemblies of the turbine engine, for example such as the fan or compression stage.

TECHNOLOGICAL BACKGROUND OF THE INVENTION

Classically, a rotor, for example of a low or high pressure turbine, comprises a disk, a series of radial blades mounted in axial housings called cavities made at the periphery of the disk, and a series of platforms that forms an annular stream inside which the gas passing through the turbine circulates.

The blades, and particularly turbine blades are traditionally made of a single metal casting. Fabrication of blades by casting can result in good dimensional tolerances, but on the other hand metal blades have a major disadvantage, namely their high mass.

It has been suggested that blades could be made from a ceramic matrix composite (CMC) material, to overcome this mass problem and with the general purpose of reducing mass in a turbine engine rotor. However, the fabrication of such blades made of CMC is relatively complex and is not well controlled, particularly for the production of blade roots and at platforms.

Thus historically, it has been proposed to make blade platforms separately and assemble them later on the disk, to facilitate fabrication of these blades. Thus, different attachment systems have been developed for platform inserts in disks.

For example, document EP1306523 discloses a rotor with a disk provided with cavities in which blades and platforms are fixed.

Document FR2608674 discloses an alternative to that described in the previous document. The document describes a rotor for a turbine engine comprising a disk in which primary cavities are formed inside which composite ceramic blade roots are inserted axially, and provided with secondary cavities in which bulbs are inserted axially forming means of attachment of platform inserts in the disk. However, in the configuration described in this document, gases can infiltrate between the platforms and the disk, particularly in the cavities of the disk, which has the effect of deteriorating the disk. Furthermore, the proposed geometry complicates assembly/disassembly.

Despite the advantages of platform inserts known in the state of the art that also facilitate assembly and disassembly of the rotor, no solution has been put forward to significantly reduce stresses in the disk of a rotor comprising a plurality of metal blades.

GENERAL DESCRIPTION OF THE INVENTION

In this context, the principle purpose of the invention is to provide a simple, efficient and economic solution to this problem by disclosing a rotor with metal blades for which the fabrication process is controlled, limiting stress in the disk at the blade attachments.

To achieve this, the invention discloses a rotor for a turbine engine comprising:
   a disk with cavities around its periphery called primary cavities;
   a plurality of blades with a root composed of a bulb in its lower part, axially locked in said primary cavities;
   a plurality of platform inserts, each being located between two consecutive blades;
   said rotor being characterised in that said platforms are provided with:
      an approximately straight plateau and a bulb extending radially under the plateau, said bulb being axially locked in secondary cavities arranged at the periphery of the disk, the secondary cavities being positioned between two consecutive primary cavities;
      a retaining bracket approximately along the axial direction, said retaining bracket forming an annular sector arranged facing at least two consecutive blades.

Thus, the rotor according to the invention has several advantages;
   the invention discloses a method of fixing platform inserts that eliminates the need for an attachment in the cavities of the disk that contain blade bulbs so as to limit stresses in the bulb and thus increase the number of blades.
   straight platform inserts cooperate with blades that facilitate assembly/disassembly of blades and platforms; unlike the rotor in document FR2608674 according to the state of the art that requires that blades and platforms should be mounted simultaneously, the invention makes it possible to assemble/disassemble the blades alone and then assemble/disassemble the platforms, or assemble a blades and then a platform alternately.

Advantageously, the platform inserts have a straight plateau and built in retaining brackets and the method of attachment of platforms onto the disk is such that, for a given architecture, it becomes possible to make the assembly with a blade geometry with a lower shank height than is possible with known blades. The reduction in the relative height of the shank at the blade root can thus reduce the total mass of each metal blade of the rotor. Consequently, the stresses at blade attachments are reduced due to the reduction in the mass of blades.

The assembly of such a blade with a reduced shank height (in other words with a bulb closer to the airfoil) is possible due to the combined use of straight platform inserts advantageously with a first series including upstream retaining brackets and a second series including downstream retaining brackets, and their method of axial and radial attachment onto the disk, particularly by means of secondary cavities. Obviously, the dimensions of the rotor disk are adapted so that the assembly can be installed. Thus, with the invention, it is possible to make an assembly with a retaining bracket positioned radially at the same level as the blade bulb or lower then the blade bulb.

Thus, the rotor according to the invention provides a means of satisfying disk load problems during operation and to reduce the mass by the order of 20% compared with known metallic rotor blades according to the state of the art.

The particular geometry of the invention also makes it possible, as a result of the retaining brackets, to create an efficient thermal overlap without changing the surrounding architecture and particularly the turbine stator.

Advantageously, the platforms are formed by:
a first series called upstream platforms with an upstream retaining bracket extending approximately along the upstream axial direction, said upstream retaining bracket forming an angular sector placed facing at least two consecutive blades;
a second series called downstream platforms with a downstream retaining bracket extending approximately along the downstream axial direction, said downstream retaining bracket forming an angular sector placed facing at least two consecutive blades;
the two series of platforms being positioned alternately in the secondary cavities.

Apart from the characteristics that have just been mentioned in the previous paragraph, the rotor according to the invention can have one or several complementary characteristics among the following, taken individually or in any technically possible combination:
each of the platforms comprises:
a first straight lateral edge that matches the root of a first blade with a straight side,
a second straight lateral edge that matches the root of a second consecutive blade with a straight side,
the upstream retaining brackets of the upstream platforms and the downstream retaining brackets of the downstream platform are formed by a first approximately radial wall connected to the plateau and by a second approximately axial wall;
the second wall of the upstream retaining bracket is radially positioned at the same level as the blade bulb or at a lower level than the blade bulb;
each of the platforms comprises:
an opening in said first approximately radial wall of the retaining bracket;
a lateral wall oriented approximately radially, located at an end opposite the retaining bracket;
each of the lateral walls of a series of platforms being adapted to cooperate with the recess in the other series of platforms;
the platforms are metallic;
the blades are metallic.

Another purpose of the invention is a turbine engine comprising a rotor according to the invention.

The invention and its different applications will be better understood after reading the following description and examining the accompanying figures.

BRIEF DESCRIPTION OF THE FIGURES

The figures are presented for information and are in no way limitative to the invention.

DETAILED DESCRIPTION OF ONE EXAMPLE EMBODIMENT OF THE INVENTION

Unless mentioned otherwise, the same element on the different figures has a single reference.

The terms upstream and downstream are defined with reference to the direction of circulation of fluid during operation of the turbine engine.

Figure 1:
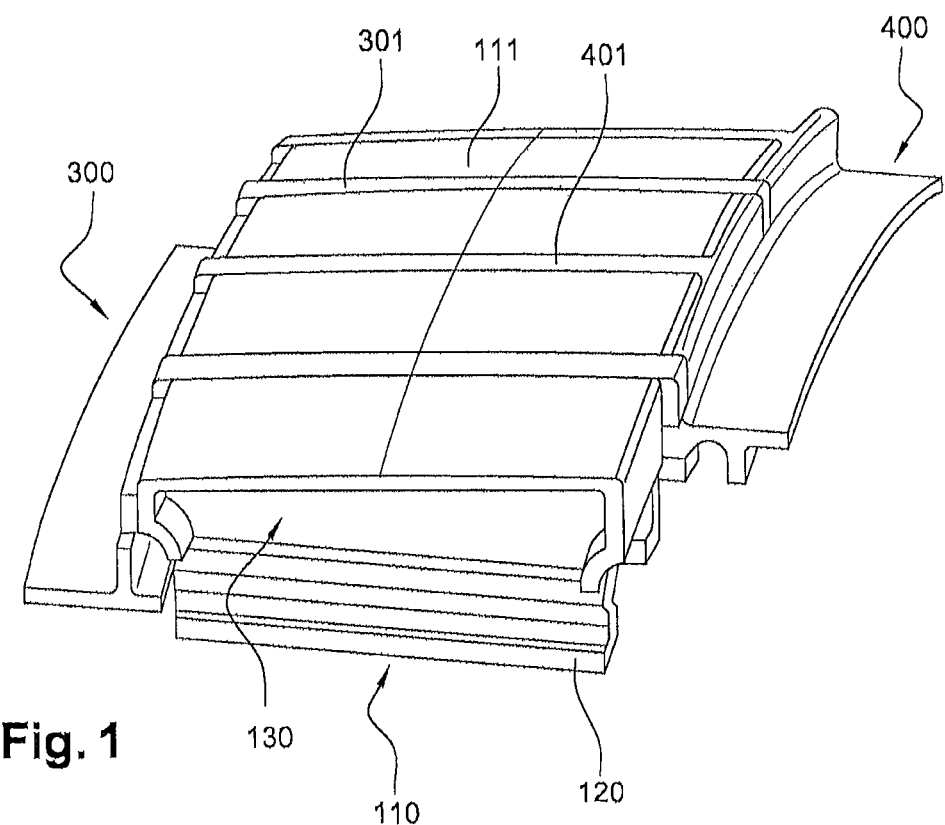
FIG. 1 is a perspective view of part of a turbine engine rotor according to the invention.

FIG. 1 is a perspective view illustrating a part of a turbine engine rotor according to the invention. More precisely, FIG. 1 illustrates four roots 110 of a blade 100 (the airfoils are not shown) and four platform inserts 300, 400 positioned between the blades 100, the assembly being virtually in position in a disk 600 (not shown on FIG. 1) of a rotating assembly formed by the rotor.

Figure 2:
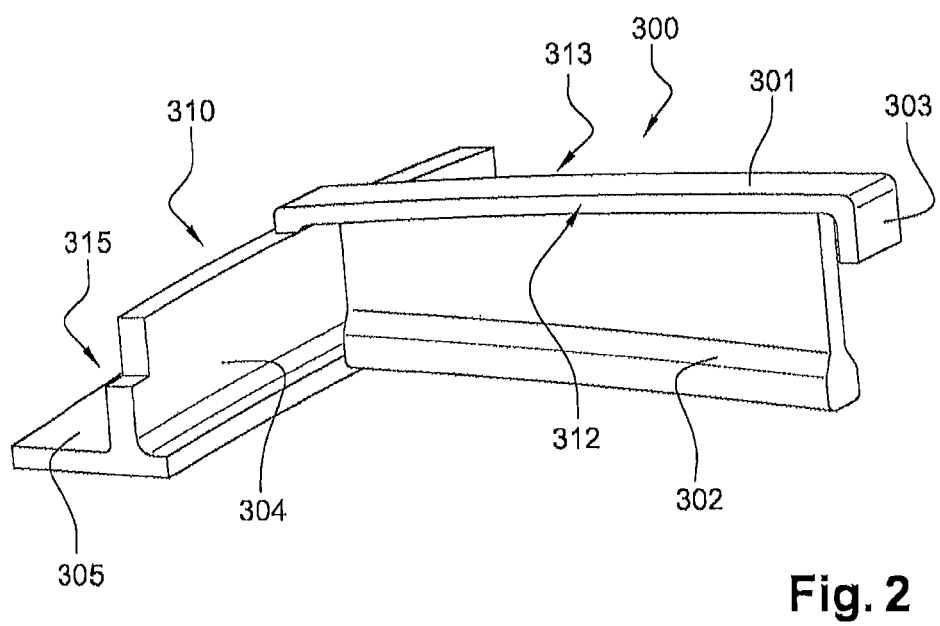
FIG. 2 is a perspective view illustrating an upstream platform of a rotor according to the invention.

FIG. 2 more particularly illustrates an upstream platform 300 of a rotor according to the invention.

Figure 3:
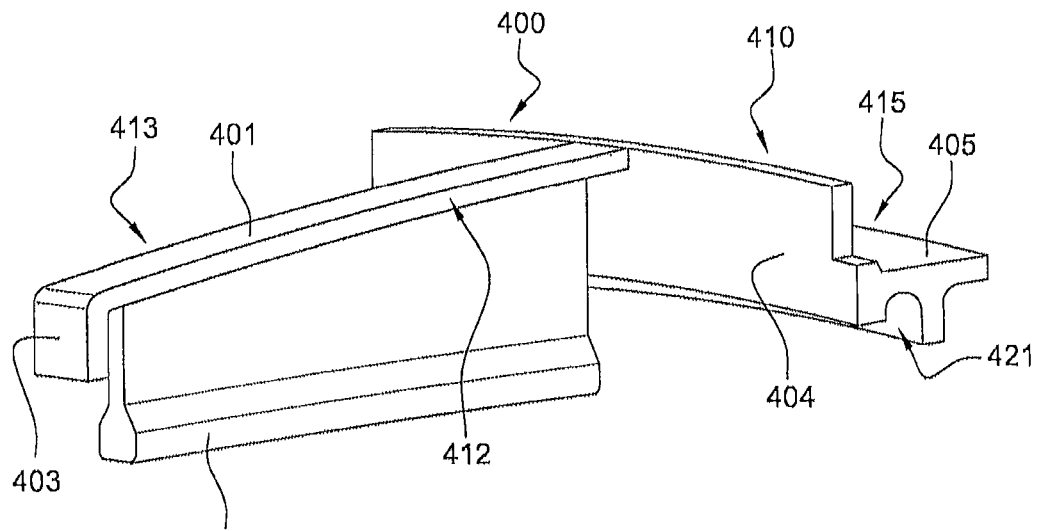
FIG. 3 is a perspective view illustrating a downstream platform of a rotor according to the invention.

FIG. 3 more particularly illustrates a downstream platform 400 of a rotor according to the invention.

Figure 4:
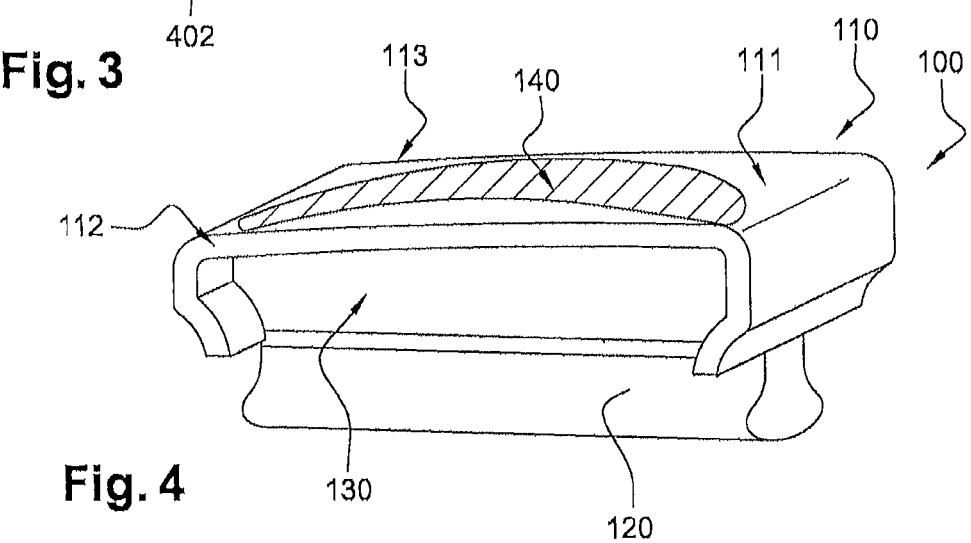
FIG. 4 is a perspective view illustrating a rotor blade root according to the invention.

FIG. 4 more particularly illustrates a blade root 110 of a rotor according to the invention.

Figure 5:
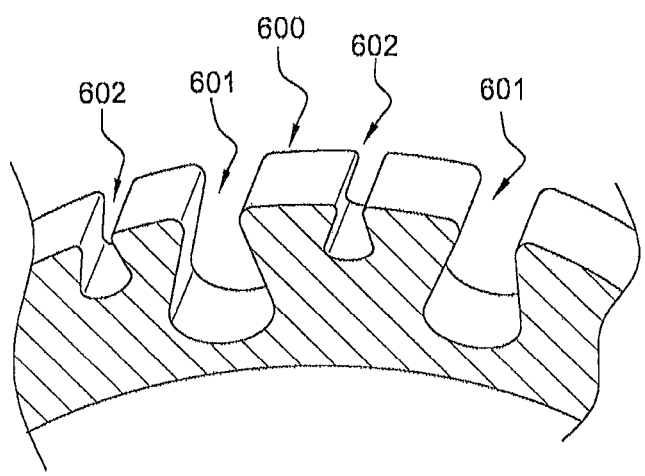
FIG. 5 is a cross-sectional view illustrating a part of the rotor disk according to the invention.

The rotor for a turbine engine, for example such as an aircraft turbojet or turboprop, comprises an annular disk 600, shown partly in FIG. 5. The external periphery of the disk 600 comprises a first plurality of cavities 601, called primary cavities (two primary cavities being shown as examples on FIG. 5), for example in the shape of a dovetail, to enable axial assembly of the roots 110 of blade 100. The disk 600 also comprises secondary cavities 602 at its external periphery positioned between two consecutive primary cavities 601. The secondary cavities 602 may also be in the shape of a dovetail or any other shape usually used for the attachment of blades to the disk 600. According to the embodiment shown on FIG. 5, the secondary cavities 602 are not as deep as the primary cavities 601 and they are smaller.

The rotor also comprises blades 100 formed from an airfoil (shown symbolically on FIG. 4 by the cross-hatched profile 140 representing the cross-section of the airfoil at its connection with the blade root 110) extending radially above a root 110 with shank 130 and a bulb 120 in the lower part, for example in the shape of a dovetail, for the attachment and retention of the blades 100 in the primary cavities 601 of the disk 600. Obviously, the shape of the bulbs 120 of the blades is complementary to the shape of the primary cavities 601 of the disk 600. The root 110 of the blades 100 also comprises a plateau 111 called the blade intermediate plateau in the upper part of the shank 130, approximately straight and forming a "base" that can retain and resist forces applied to the airfoil.

The rotor also comprises platforms 300, 400 (illustrated more particularly in FIGS. 2 et 3), that are inserts, not fixed to the blades, that have a central part 301, 401 forming a plateau, that can be inclined relative to the axis of revolution of the rotor. The plateau 301, 401 is prolonged firstly by a lateral wall 303, 403 extending along a radial direction, and secondly by a retaining bracket 310, 410.

The retaining brackets 310, 410 integrated into the platform inserts 300, 400 are composed of a first wall 304, 404 extending in the radial direction, called the radial wall, directly connected to the plateau 301, 401, and by a second wall 305, 405 called the axial wall, attached to the first wall 304, 404 and extending along an axial direction. The retaining brackets 310, 410 of each platform constitute sectors of an annular assembly composed of the plurality of retaining brackets in position on the rotor disk 600. According to one example embodiment, the size of the annular sector composed of the retaining bracket of each platform is determined such that the retaining bracket covers two consecutive blades.

In one alternative embodiment, several platforms can be connected to each other by a common retaining bracket and thus extend over a wider angular sector and the retaining bracket can cover more than two consecutive blades. A larger angular sector can reduce the number of interfaces between retaining brackets and thus limit air leaks, however stresses due to thermal expansion become limiting beyond a certain angular sector.

The plateaux 301, 401 are connected to a bulb 302, 402 that extends radially under the platforms 301, 401, and that locks the platforms 300, 400 radially in the secondary cavities 602 of the annular disk 600. According to one example embodiment of the invention, the bulb 302, 402 of the platforms 300, 400 is located at the middle of the plateau 301, 401.

The rotor according to the invention comprises two types of platforms: the platforms 300 called the upstream platforms, comprising a shank 310 that will be positioned upstream from the blades illustrated particularly in FIG. 2, and the platforms 400 called the downstream platforms comprising a retaining bracket 410 that will be positioned downstream from the blades illustrated particularly in FIG. 3. Each type of platform 300, 400 is positioned on the disk 600 alternately between two consecutive blades 100.

When the platform inserts 300, 400 are in position in the secondary cavities 602 of the disk 600 between the blades 100 as illustrated in FIG. 1, the plateaux 301, 401 of the platforms 300, 400 fill in the space between the intermediate plateaux 111 of the blades 100. Thus, the straight lateral edges 312, 313, 412, 413 of the plateaux 301, 302 are adapted to match the straight lateral sides 112, 113 of the intermediate plateaux 111 of the roots of blades 100.

An opening 315 or recess is formed in the radial wall 304 of the retaining bracket 310 of the upstream platforms 300, in which the side wall 403 of the downstream platform 400 will fit when the platforms 300, 400 are in position in the secondary cavities 602, so as to form a continuous upstream annular retaining bracket.

In exactly the same manner, an opening 415 is formed in the radial wall 404 of the retaining bracket 410 of the downstream platforms 400, in which the side wall 303 of the upstream platform 300 will fit when the platforms 300, 400 are in position, so as to form a continuous downstream annular retaining bracket.

According to a first embodiment, axial locking of the blades and platform inserts 300, 400 in the secondary cavities 602 is traditionally done by ad-hoc means for example such as annular shells that block axial displacements of blades and platforms 300, 400.

Figure 6:
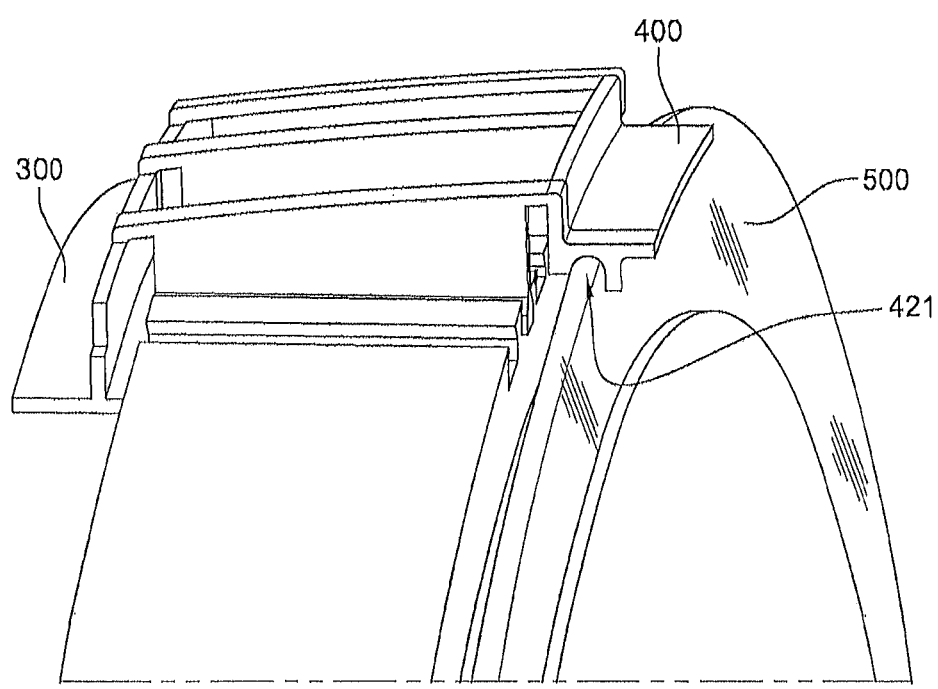
FIG. 6 is a perspective view of a part of a turbine engine rotor according to the invention, more particularly illustrating an example embodiment of a means of axially retaining platform inserts of a rotor according to the invention.

According to a second embodiment illustrated particularly in FIG. 6, the platform inserts 300, 400 are held in place axially by means of a annular split ring 500 and an annular shell (not shown) bearing on the annular ring 500 so as to block its axial position. To achieve this, the platforms 300, 400 comprise retaining means formed by a annular groove 421 located on the downstream part of platforms and the dimensions of which are adapted to hold and retain the outer peripheral part of the annular split ring 500 in place. Thus, axial displacements of the platforms 300, 400 are blocked by the annular ring 500 when the annular ring is clamped by a traditional annular shell at its inner peripheral part.

According to this embodiment, the blades are retained in the axial direction by the platform inserts 300, 400.

Advantageously, the blades and the platform inserts are metallic.

The invention has been described particularly for metallic blades and metallic platforms, however, the invention is equally applicable to blades made of a ceramic matrix composite (CMC) material and/or platforms made of a ceramic matrix composite (CMC) material.

The invention has been described particularly for a high or low pressure turbine stage of a turbine engine; however, the invention is also applicable to other rotating assemblies of the turbine engine, for example such as the fan.

The invention claimed is:

1. A rotor for a turbine engine comprising:
   a disk with primary cavities around a periphery of the disk;
   a plurality of blades, each blade comprising a root composed of a bulb in a lower part of the root locked in one of said primary cavities;
   a plurality of platforms, each platform being located between two consecutive blades;
   wherein each platform is provided with:
   a straight plateau and a bulb extending radially under the plateau, said bulb extending radially under the plateau being locked in one of secondary cavities arranged at the periphery of the disk, the secondary cavities being positioned between two consecutive primary cavities, and
   a retaining bracket extending along an axial direction of the rotor, said retaining bracket forming an annular sector arranged facing at least two consecutive blades
   wherein said plurality of platforms are formed by:
   a first series of upstream platforms, each upstream platform comprising an upstream retaining bracket extending along an upstream axial direction, said upstream retaining bracket forming an angular sector placed facing at least two consecutive blades;
   a second series of downstream platforms, each downstream platform comprising a downstream retaining bracket extending along a downstream axial direction, said downstream retaining bracket forming an angular sector placed facing at least two consecutive blades;
   the first and second series of platforms being positioned alternately in the secondary cavities.

2. The rotor for a turbine engine according to claim 1, wherein each of the platforms comprises:
   a first straight lateral edge that matches the root of a first blade with a straight side, and
   a second straight lateral edge that matches the root of a second consecutive blade with a straight side.

3. The rotor for a turbine engine according to claim 1, wherein each upstream retaining bracket of the upstream platforms and each downstream retaining bracket of the downstream platforms is formed by a first radial wall connected to the plateau and by a second axial wall.

4. The rotor for a turbine engine according to claim 3, wherein the second axial wall of each upstream retaining bracket is radially positioned at the same level as the bulb of each blade or at a lower level than the bulb of each blade.

5. The rotor for a turbine engine according to claim 3, wherein each platform of said first series of upstream platforms and each platform of said second series of downstream platforms comprises:
- an opening in said first radial wall of the retaining bracket;
- a lateral wall oriented radially, located at an end opposite the retaining bracket, each of the lateral walls of said first series of upstream platforms being adapted to cooperate with a recess of said second series of downstream platforms.

6. The rotor for a turbine engine according to claim 3, wherein each platform of said first series of upstream platforms and each platform of said second series of downstream platforms comprises:
- an opening in said first radial wall of the retaining bracket;
- a lateral wall oriented radially, located at an end opposite the retaining bracket,
- each of the lateral walls of said second series of downstream platforms being adapted to cooperate with a recess of said first series of upstream platforms.

7. The rotor for a turbine engine according to claim 1, wherein the platforms are metallic.

8. The rotor for a turbine engine according to claim 1, wherein the blades are metallic.

9. The rotor for a turbine engine according to claim 1, further comprising an annular split ring retained in position along the axial direction of the rotor by an annular flange, said plurality of platforms comprising axial retaining means arranged to cooperate with said annular split ring so as to block axial displacements of said platforms.

10. A turbomachine comprising a rotor according to claim 1.

11. The rotor for a turbine engine according to claim 1, wherein the primary and secondary cavities are formed on a same outer wall of the disk, said outer wall defining the periphery of the disk.

12. The rotor for a turbine engine according to claim 1, wherein a single one of the secondary cavities is positioned between two consecutive primary cavities.

* * * * *